US012692564B2

(12) United States Patent
Prabhu et al.

(10) Patent No.: US 12,692,564 B2
(45) Date of Patent: Jul. 28, 2026

(54) ELECTRIC INDUCTION HEATING AND MELTING FURNACE REFRACTORY LIFE CYCLE WEAR IMAGING AND PROCESSING

(71) Applicant: Inductotherm Corp., Rancocas, NJ (US)

(72) Inventors: Satyen N. Prabhu, Voorhes, NJ (US); Adam J. Westerland, Mount Laurel, NJ (US)

(73) Assignee: INDUCTOTHERM CORP., Rancocas, NJ (US)

( * ) Notice: Subject to any disclaimer, the term of this patent is extended or adjusted under 35 U.S.C. 154(b) by 415 days.

(21) Appl. No.: 18/236,424

(22) Filed: Aug. 22, 2023

(65) Prior Publication Data

US 2023/0392219 A1 Dec. 7, 2023

Related U.S. Application Data

(62) Division of application No. 16/859,237, filed on Apr. 27, 2020, now Pat. No. 11,788,161.

(60) Provisional application No. 62/839,721, filed on Apr. 28, 2019.

(51) Int. Cl.
| | |
|---|---|
| *C21C 5/44* | (2006.01) |
| *B22D 41/00* | (2006.01) |
| *B22D 41/02* | (2006.01) |
| *G01N 21/41* | (2006.01) |

(52) U.S. Cl.
CPC .............. *C21C 5/44* (2013.01); *B22D 41/003* (2013.01); *B22D 41/02* (2013.01); *G01N 21/41* (2013.01)

(58) Field of Classification Search
CPC . C21C 5/44; C21C 5/5247; C21C 2005/5288; B22D 41/003; B22D 41/02; G01N 21/41; G01N 21/954; G01N 21/8851; G01N 2021/8887; F27D 21/0021; F27D 1/00
USPC ...................................... 266/99, 280
See application file for complete search history.

(56) References Cited

U.S. PATENT DOCUMENTS

| | | | | |
|---|---|---|---|---|
| 8,072,613 | B2 * | 12/2011 | Schmitz ................. | G01B 11/24 356/601 |
| 8,083,982 | B2 * | 12/2011 | Kirchhoff ............... | C10B 29/06 425/13 |
| 9,816,917 | B2 * | 11/2017 | Sudo ......................... | G01L 1/24 |
| 11,268,766 | B2 * | 3/2022 | Picco .................. | F27D 21/0014 |
| 11,788,161 | B2 * | 10/2023 | Prabhu .................. | C21C 5/5247 266/99 |
| 2002/0158368 | A1 * | 10/2002 | Wirth, Jr. ............ | F27D 21/0021 425/13 |

* cited by examiner

*Primary Examiner* — Jessee R Roe
*Assistant Examiner* — Michael Aboagye
(74) *Attorney, Agent, or Firm* — Robert J. Everling

(57) ABSTRACT

A method is provided for life cycle wear monitoring of a consumable refractory in an electric induction furnace used for heating and melting materials by accumulating laser imaging data of the refractory's inner surface periodically over the refractory's life cycle while the furnace is utilized in a foundry environment and processing the accumulated imaging data for comparative analysis with previous laser imaging data of the refractory's inner surface.

16 Claims, 9 Drawing Sheets

ELECTRIC INDUCTION HEATING AND MELTING FURNACE REFRACTORY LIFE CYCLE WEAR IMAGING AND PROCESSING

CROSS REFERENCE TO RELATED APPLICATIONS

This is a divisional application of application Ser. No. 16/859,237, filed Apr. 27, 2020, now U.S. Pat. No. 11,788, 161, which claims the benefit of U.S. Provisional Application No. 62/839,721, filed Apr. 28, 2019, both of which applications are hereby incorporated by reference in their entireties.

FIELD OF THE INVENTION

The present invention relates generally to life cycle monitoring of consumable refractories in electric induction heating and melting furnaces, and in particular, to collecting infrared laser imaging data of the refractory lining's inner surface over the refractory's life cycle and processing the imaging data for analysis of refractory wear.

BACKGROUND OF THE INVENTION

FIG. 1(a) illustrates one example of a typical electric induction furnace for inductively heating and melting materials with a consumable refractory lining 112 that is also referred to as a coreless induction furnace. Consumable refractory lining 112 (shown stippled in the figure) consists of a material with a high melting point that is used to line the inside walls of the furnace and form interior furnace volume 114 that is also referred to as the furnace's crucible volume. A metal or other at least partially electrically conductive material is placed within volume 114 and is heated and melted by electric induction when alternating current flows through induction coil 116. Induction coil 116 surrounds at least a portion of the exterior height of the furnace and the alternating current flowing through the coil creates a magnetic flux that couples with the material placed in volume 114 to inductively heat and melt the material. Furnace foundation 118 is formed from a suitable material such as refractory bricks or cast blocks. Coil 116 can be embedded in a trowelable refractory (grout) material 120 that serves as thermal insulation and protective material for the coil. A typical furnace ground leak detector system includes probe wires 122a protruding into melt volume 114 through the bottom of lining 112 as illustrated by wire end 122a' protruding into the melt volume. Wires 122a are connected to electrical ground lead 122b, which is connected to a furnace electrical ground (GND). Wires 122a, or other arrangements used in a furnace ground leak detector system may be generally referred to as a ground probe.

As the furnace in FIG. 1(a) is used to form repeated melts within volume 114 that are poured or otherwise drawn from the furnace for further industrial processing such as metal casting in molds, lining 112 is gradually consumed. Lining 112 is replenished in a furnace relining process after a point in the (life cycle) service life of the furnace. Although it is contrary to safe furnace operation and disregards the recommendation of the refractory manufacturer and installer, an operator of the furnace may independently decide to delay relining until refractory lining 112 between the molten metal inside furnace volume 114 and coil 116 has deteriorated to the state that furnace coil 116 is damaged and requires repair, and/or foundation 118 has been damaged and requires repair. In such event, the furnace relining process becomes extensive.

FIG. 1(b) illustrates an alternative electric induction furnace for inductively heating and melting materials where the replaceable lining 112 is backed by a permanent lining 124. For example a cast flowable refractory 124 is disposed between coil 116 and consumable furnace lining 112.

Monitoring consumable refractory lining wear during the refractory's life cycle helps predict when the consumable refractory lining needs to be replaced to avoid damage to the induction furnace. In the present art, manual measurements of a consumable refractory lining can be made after each withdrawal of the melt (molten material) from the electric induction furnace after allowing time for the refractory lining to cool down. Cool down time in combination with the time required for making the manual measurements, decreases the induction furnace's in-service time.

It is one object of the present invention to provide a time efficient apparatus and method for monitoring of consumable refractory lining wear after each withdrawal of the melt from an electric induction furnace for inductively heating and melting materials over the life cycle of the consumable refractory lining from initial refractory installation to refractory replacement in a coreless electric induction furnace as typically illustrated in FIG. 1(a) or FIG. 1(b).

Another object of the present invention is a non-invasive electric induction furnace refractory life cycle wear imaging system that scans the interior walls and bottom of the furnace from the outside of the furnace and provides a time efficient non-invasive way to monitor the furnace refractory wear with minimal interruption to furnace processes by being deployed over top of the furnace in a small amount of time.

BRIEF SUMMARY OF THE INVENTION

In one aspect the present invention is an infrared laser refractory scanning system installed in a foundry environment for collecting imaging data of a consumable refractory's inner surface over the refractory's life cycle and processing the imaging data for analysis of refractory wear.

In another aspect the present invention is a method of infrared laser refractory scanning the inner surface of a consumable refractory lining installed in an electric induction furnace in a foundry environment to collect imaging data of the inner surface over the refractory's life cycle and processing the imaging data for analysis of refractory wear.

The above and other aspects of the invention are set forth herein and the appended claims.

BRIEF DESCRIPTION OF THE DRAWINGS

The appended drawings, as briefly summarized below, are provided for exemplary understanding of the invention, and do not limit the invention as further set forth in this specification.

DETAILED DESCRIPTION OF THE INVENTION

Figure 1A:
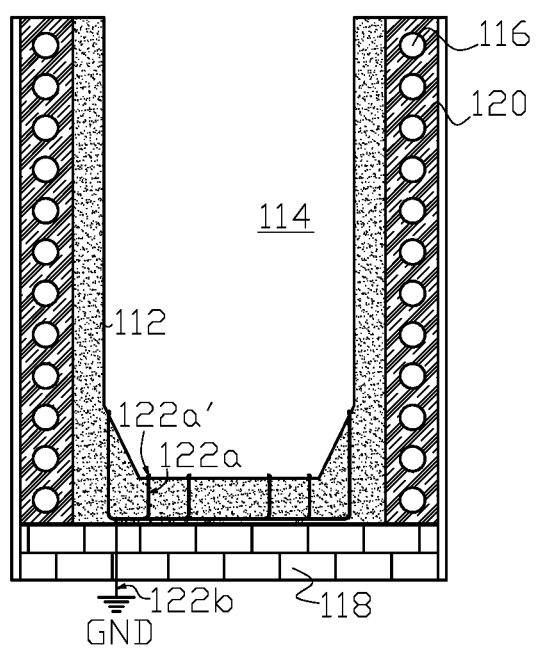
FIG. 1(a) is a cross sectional elevation view of a typical coreless electric induction furnace with a consumable refractory lining for inductively heating and melting materials.
Figure 1B:
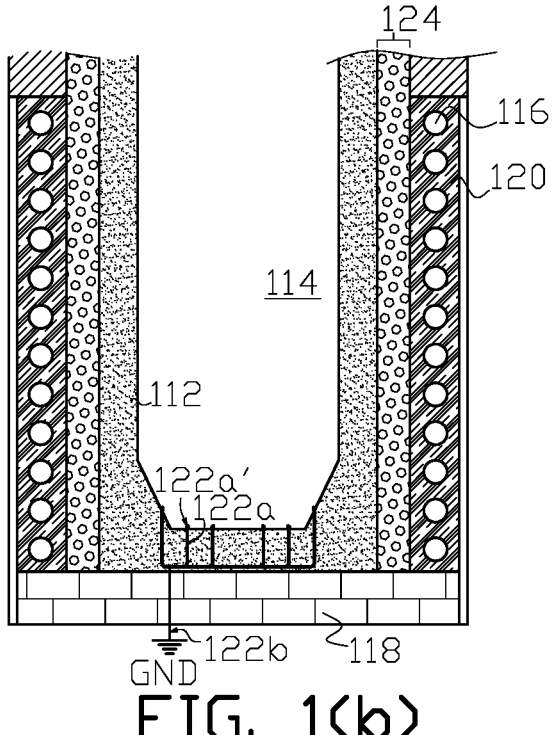
FIG. 1(b) is a cross sectional elevation view of another type of typical coreless electric induction furnaces with an outer permanent refractory lining and an inner consumable refractory lining for inductively heating and melting materials.
Figure 2:
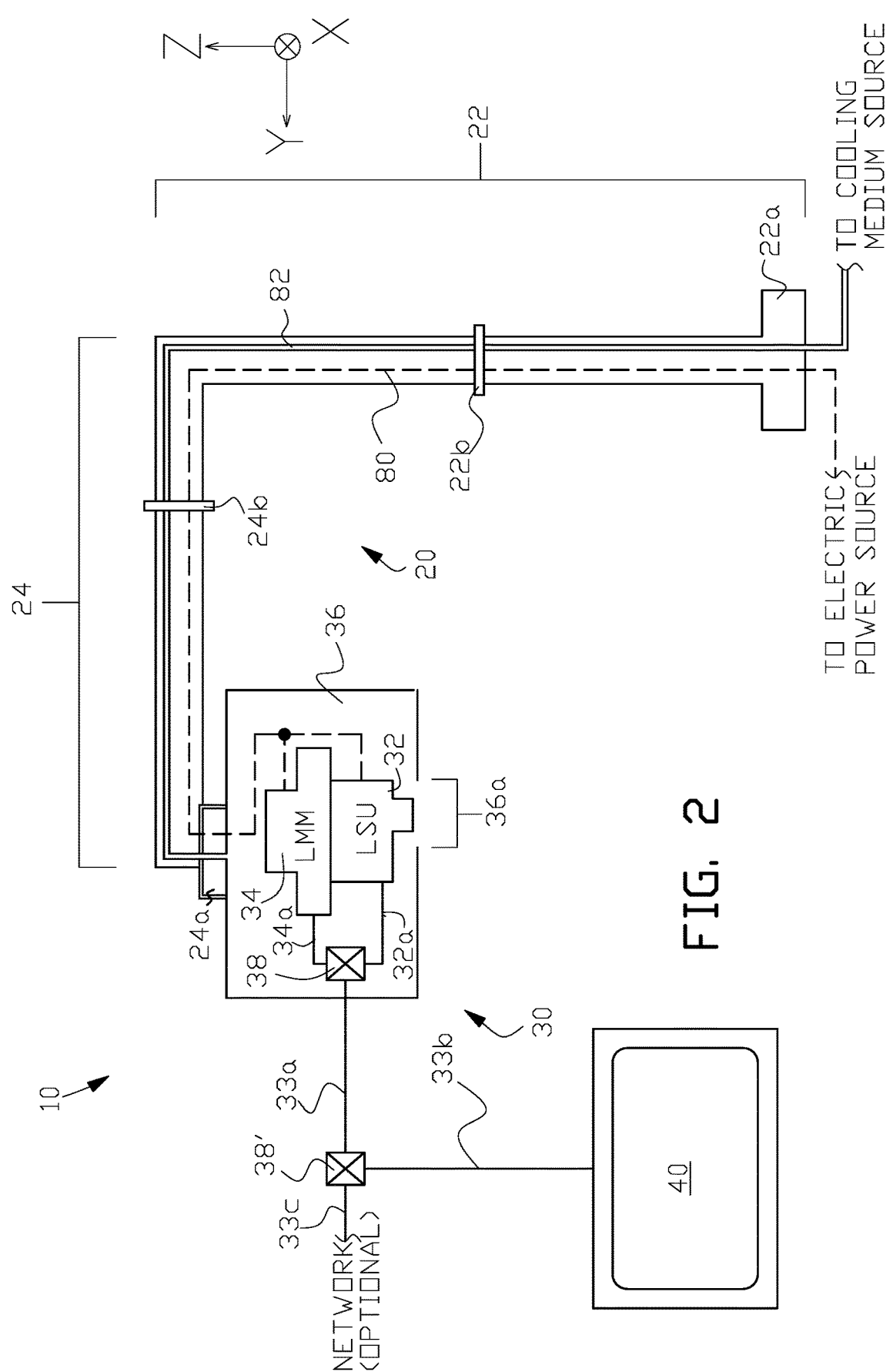
FIG. 2 illustrates one embodiment of a refractory life cycle wear imaging and refractory image processing system for an electric induction furnace of the present invention.

There is shown in FIG. 2 one example of a refractory life cycle wear imaging and image processing system 10 of the present invention. In this embodiment the system comprises a foundry imaging mounting system 20, a laser imaging assembly 30 and a human machine interface 40.

Foundry imaging mounting system 20 comprises vertically-oriented mounting structure (VOMS) 22 and horizontally-oriented mounting structure 24 (HOMS). In this embodiment of the invention base 22a of the vertically-oriented mounting structure is suitably attached to structure in the vicinity of coreless electric induction furnace 90 as illustrated, for example, in FIG. 3. In this embodiment base 22a at a first VOMS end is fixed to the furnace's melt deck 92 which is a horizontal structural level adjacent to the furnace where the electric induction furnace's heating and melting processes are performed, such as removing slag from a melt (molten material) in the refractory crucible of the furnace. The length of the vertically-oriented mounting structure is selected so that the laser imaging assembly 30 is at a height "d" above the top C t of the interior volume of the crucible of the induction furnace. In this embodiment of the invention a first HOMS end of the horizontally-oriented mounting structure is fixed perpendicular to the upper (second VOMS) end of the vertically-oriented mounting structure. The length of the horizontally-oriented mounting structure is selected so that horizontally-oriented mounting structure is at least sufficiently long to allow a human operator to visually center (at center $C_c$) the relative laser beam line of sight $LB_{los}$ from the laser imaging assembly in a horizontal plane (for example a horizontal plane $C_{hp}$ depicted by a dashed line in FIG. 3) of the interior volume of the crucible. In the illustrated embodiment of the invention, precise centering of the laser beam line of sight is not required since the image processing system in the present invention generates centered 3D point cloud visualizations for all refractory surface scans that establishes coherently centered and aligned refractory lining surface geometries for all refractory surface scans; therefore the "human operator to visually center" process can be referred to as "approximately centering." Optionally either the vertically-oriented mounting structure or the horizontally-oriented mounting structure, or both structures, may include a VOMS length adjustor 22b or a HOMS length adjustor 24b for fine-tuning the horizontally-oriented mounting structure and the vertically-oriented mounting structure location of the laser beam line of sight from the laser imaging assembly 30 offset over the height from the top of the interior volume of the crucible. For example length adjustor 22b or 24b can be an adjustable telescoping length of the respective mounting structure that can telescope in or out of the vertically-oriented mounting structure or the horizontally-oriented mounting structure.

In other embodiments of the invention the foundry imaging mounting system is alternatively configured to provide a structural mount adjacent to the electric induction heating and melting furnace so that the laser imaging assembly attached to the alternative structural mount is centered approximately over the center of the empty crucible's refractory.

In the illustrated embodiment of the invention, laser imaging assembly 30 comprises laser sensor unit (LSU) 32 and laser motion mount (LMM) 34, to which the laser sensor unit is attached. The laser sensor unit and attached laser motion mount are installed in enclosure 36 in the illustrated invention with the enclosure suitably rated for a foundry environment.

Figure 3:
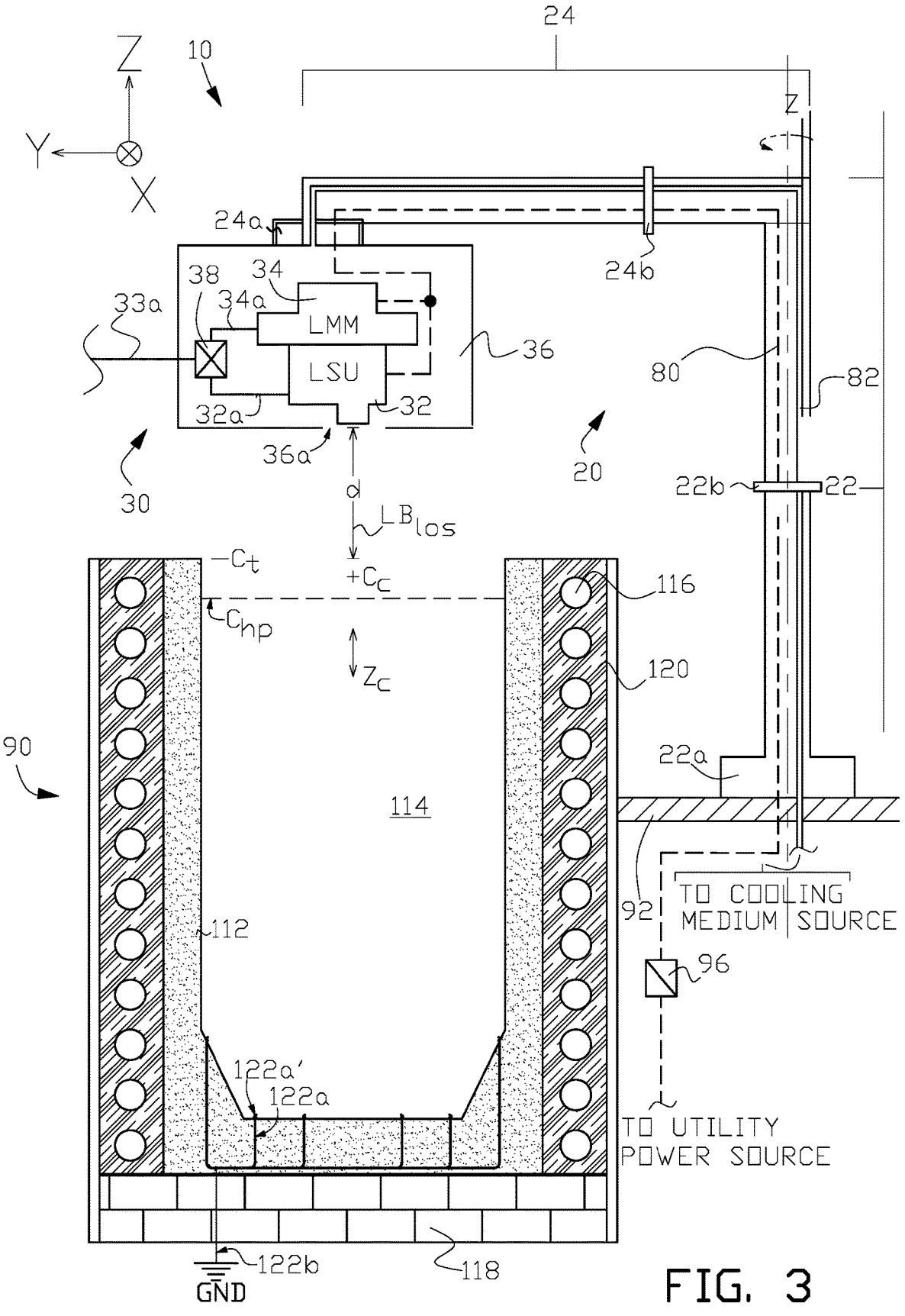
FIG. 3 illustrates the refractory life cycle wear imaging and refractory image processing system illustrated in FIG. 2 with the system in a "refractory scan" position of a coreless electric induction furnace.

Laser sensor unit 32 is positioned at vertical offset distance "d" above the crucible top C t of induction furnace 90 in FIG. 3. In a particular application, top offset distance "d" is determined by: (1) the magnitude of heat radiated from a hot empty crucible to the laser sensor unit when the laser sensor unit is in the "refractory scan" position before the crucible has cooled down and then a refractory scan is executed and (2) limitations to the angular laser beam projections required on the sidewall and bottom of the refractory's inner surface based on the geometry of the furnace's crucible volume during a 2D laser plane scan process in a particular application.

In the illustrated embodiment of the invention, laser imaging assembly mount 24a is connected to the second HOMS end of the horizontally-oriented mounting structure opposite the first HOMS end of the horizontally-oriented mounting structure attached to the second VOMS end of the vertically-oriented mounting structure. In this example of the invention both the laser sensor unit 32 and attached laser motion mount 34 are enclosed in a foundry rated laser protective environmental enclosure 36 which is suitably connected to laser imaging assembly mount 24a. In some embodiments of the invention laser imaging assembly mount 24a and enclosure 36 are connected via a quick connect and disconnect mount to allow the laser imaging assembly 30 to be transferred between multiple foundry imaging mounting systems 20 located adjacent to other electric induction furnaces in the foundry. In other embodiments of the invention, the laser sensor unit and attached laser motion mount are connected directly to the second HOMS end of the horizontally-oriented mounting structure.

Figures 6A, 6B:
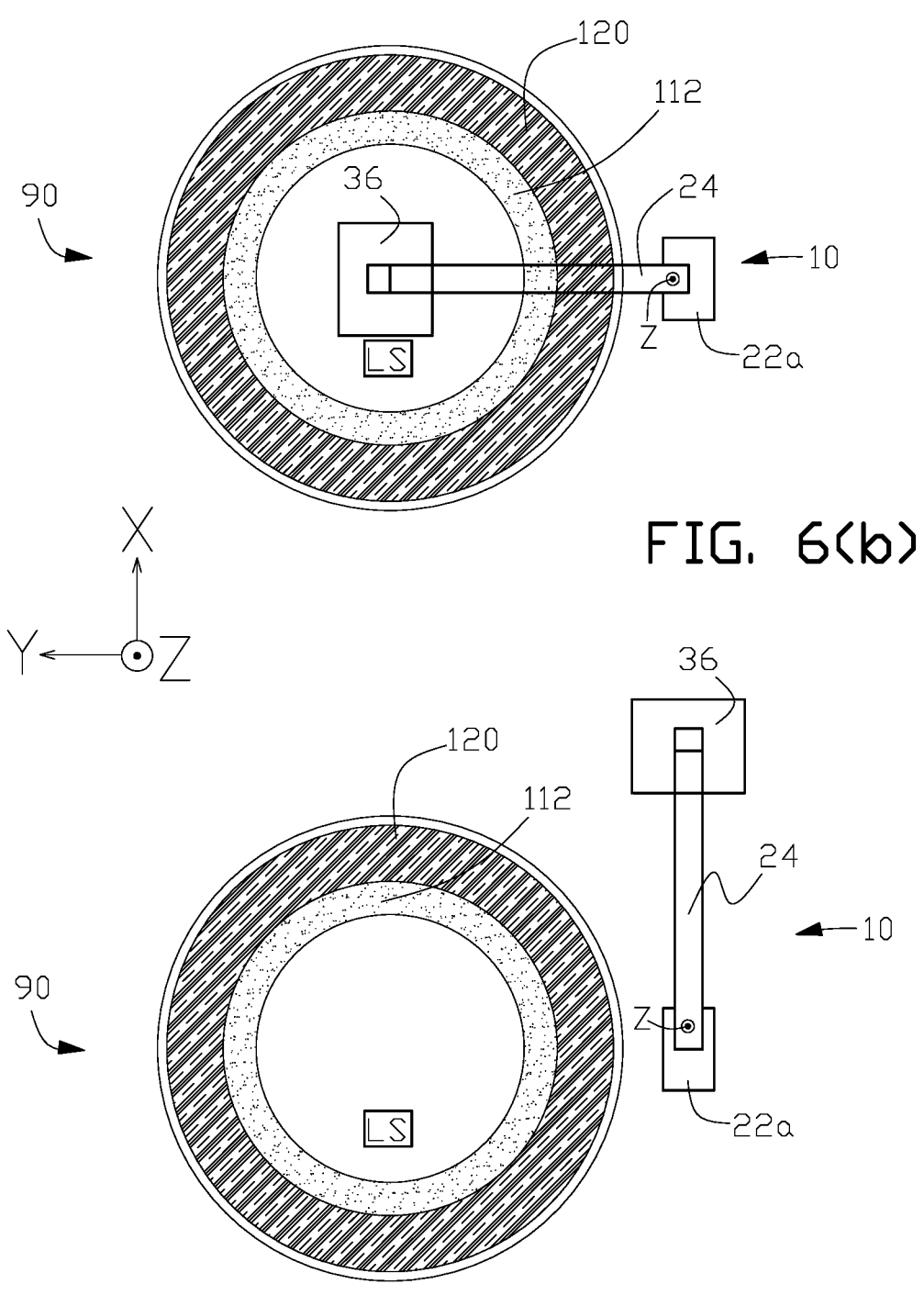
FIG. 6(a) illustrates the refractory life cycle wear imaging system in FIG. 2 in a "stowed" position during which electric induction furnace heating and melting processes can be performed.
FIG. 6(b) illustrates the refractory life cycle wear imaging system in FIG. 2 in a "refractory scan" position during which scanning of the refractory lining surface can be performed.

In the embodiment of the invention illustrated in the drawings, vertically-oriented mounting structure 22, with connected horizontally-oriented mounting structure 24 and attached laser imaging assembly 30 rotate around the vertical (Z-axis) between a "refractory scan" position shown, for example, in FIG. 6(b) and a "stowed" position shown in FIG. 6(a). Rotation between these two positions is alternatively accomplished either manually or remotely, for example, at HMI 40 or in a remote control room, via a remotely controlled rotary gear motor drive within base 22a. In some embodiments of the invention limit switch LS is provided at the "refractory scan" position for confirmation that the laser imaging assembly 30 is properly oriented in a refractory scan position.

In the illustrated example of the invention laser sensor unit 32 operates as a two-dimensional light detection and ranging device (sometimes referred to as a Light Detection and Ranging (LIDAR) device in the art) in the infrared range to perform a series of two-dimensional (2D) vertically-oriented planar refractory surface scans (also referred to as 2D laser plane scans) during a total scan process of the refractory's inner surface. One suitable laser sensor unit in a system of the present invention is a R2000 series 2D laser scanner available from Pepperl+Fuchs GmbH (Mannheim, GERMANY) or equivalent as required in the disclosure of the present invention.

Laser sensor unit 32 is attached to laser motion mount 34 which provides at least panning (rotation) of the laser sensor unit in a X-Y plane (perpendicular to Z vertical direction) as defined by the three-dimensional Euclidian space with Cartesian coordinate system used in the drawings for explanatory reference. Laser motion mount 34 rotates the laser sensor unit around a central vertical axis ($Z_c$ in FIG. 3) of the interior of the crucible to advance the laser sensor unit between each one of the series of 2D laser plane scans during a total scan process of the refractory's inner surface. One suitable laser motion mount in a system of the present invention is Pan-Tilt Unit model PTU-D48 E series available from LFIR Motion Control Systems, Inc. (Burlington, California USA) or equivalent as required in the disclosure of the present invention.

In other embodiments of the invention, the laser sensor unit and laser motion mount are provided as an integral unit of the laser imaging assembly either with, or without, an optional foundry environmental enclosure where the laser motion mount rotates the laser sensor unit around central vertical axis ($Z_c$) of the interior of the crucible to perform the advancement between each one of the series of 2D laser plane scans that are performed during the total scan process of the refractory's inner surface.

In the illustrated embodiment of the invention the hollow interiors of the vertically-oriented mounting structure and the horizontally-oriented mounting structures are utilized to supply electric power to laser sensor unit 32 and laser motion mount 34 as diagrammatically represented by dash line 80 in the figures and may be electric cables, bus bars or other forms of suitable electrical conductors. The parameters of the supplied electric power are as required by laser sensor unit 32 and laser motion mount 34 for a particular application. For example if the required electric power for the laser sensor unit and laser motion mount is 24 volts DC, the electric power may be from a suitable utility power source inputted to power converter 96 with utility power input and 24 volt DC output. The power converter is provided in an enclosure suitably rated for the environment in which it is installed, either above or below (as shown in FIG. 3) melt deck 92.

In the illustrated embodiment of the invention, the hollow interiors of the vertically-oriented mounting structure and the horizontally-oriented mounting structure are utilized to supply forced cooling medium such as air or gas to the interior of enclosure 36 with the cooling medium keeping the environment within the enclosure at a maximum allowable specified temperature and humidity as required for operation of laser imaging assembly 30 at least when in the "refractory scan" position. Supply of the cooling medium through the vertically-oriented mounting structure and the horizontally-oriented mounting structure is diagrammatically represented by cooling medium tubing 82 and may be any suitable type of cooling medium transmission as required in a particular application. In the embodiment of the invention shown in the drawings, enclosure 36 is enclosed from the ambient foundry environment except for laser port opening 36a which is sufficiently large to allow unobstructed laser beam transmission ($LB_{los}$) to and from the laser sensor unit when executing a refractory distance measurement from the refractory's surface. The forced cooling medium is supplied to enclosure 36 at a pressure as required to maintain a positive pressure within the enclosure while the cooling medium flows from the interior of the enclosure to the foundry environment through laser port opening 36a of enclosure 36.

Laser sensor unit communication channel 32a and laser motion mount communication channel 34a comprise suitable transmission medium such as wire or optical fiber with suitable transmission channel devices. In other embodiments of the invention the communication channels may include, at least in part, wireless components for wireless transmission of control and data signals between the laser sensor unit, the laser motion mount and human machine interface (HMI) 40 that provides a user (operator) interface with the imaging system. In one embodiment of the invention, the laser sensor unit and laser motion mount communication channels are preferably Ethernet channels. In the embodiment of the invention shown in the drawings the communication channels are multiplexed via multiplexor/switch 38 located within foundry environmental enclosure 36; in other embodiments of the invention, the multiplexor/switch is located in the foundry environment either above or below melt deck 92 within an enclosure rated for the installed environment.

In the embodiment of the invention as shown, for example in FIG. 2, control and data signals via communication channels 32a, 34a, 33a and 33b are transmitted between laser sensor unit 32 and laser motion mount 34 and at least one human machine interface (HMI) 40. In some examples of the invention the human machine interface is a programmable logic controller (PLC) with suitable connected human operator input and output peripheral devices as known in the art, such as a keyboard, mouse, touch pad, display monitor and printer. In other examples of the invention, as illustrated in the figures, the human machine interface is a panel PC that is optionally mounted in a foundry control panel remotely located from the foundry environment and can incorporate a touch screen for human operator interaction with the laser sensor unit and laser motion mount and other components of the refractory life cycle wear imaging and image processing system of the present invention.

Optionally in some embodiments of the invention communication channel 33c may be provided for connection to a network via switch 38' in FIG. 2 or other suitable network connecting devices to accommodate local or remote human machine interface devices and/or local or remote refractory wear scan data storage devices.

In one embodiment of the invention, the sequence of a laser scan process of a complete refractory's inner surface is illustrated in the drawings as a plurality of sequential two dimensional (2D) planar diameter laser scan patterns (also referred to as 2D laser plane scans). For example, in one embodiment shown in FIG. 4 and FIG. 5(a), two dimensional planar diameter sweep plane $P_s$ (in a Y-Z plane) is executed by taking successive laser distance measurements with the laser sensor unit across a diameter of the interior volume of the crucible of the electric induction furnace as represented diagrammatically in FIG. 4 by sweep laser beams $P_{s1}$ to $P_{s15}$ in crucible diameter of plane $P_s$ measuring the refractory surface distance from upper left refractory wall surface point $R_{s1}$ via laser beam $P_{s1}$ to the refractory surface distance from upper right refractory wall surface point $R_{s15}$ via laser beam $P_{s15}$. In this embodiment of the invention send and return laser beam sweep motion in plane $P_s$ is performed by two dimensional rotation of the send and return laser beams to and from the laser sensor unit.

Incrementally progressive two dimensional planar diameter laser scans are diagrammatically represented by sample sequential scanning planes $P_s$, $P_2$, $P_3$ and $P_f$ (rotating about a central vertically-oriented $Z_c$ axis) until a 180 degree diameter scan sweep is completed to accumulate a complete data set of the refractory's inner surface. In one embodiment of the laser scan method of the present invention there are at least three variables controlling the generation of a complete data set of the refractory's inner surface for tracking life cycle refractory surface wear.

Variable (1) is the incremental angular ($\theta$ in FIG. 4) laser beam shift between successive laser measurements in each measurement sample diameter (Y-Z) plane. For example, as diagrammatically illustrated in FIG. 4 and FIG. 5(a), the two-dimensional measurement sample diameter plane is $P_s$ (also shown in FIG. 5(b)) and the incremental angular laser beam shift between successive laser measurements are the arc angles ($\theta$) between adjacent laser measurements (illustrated with dashed lines) namely $P_{S1}$-$P_{s2}$ . . . $P_{S14}$-$P_{s15}$ in FIG. 4.

Figure 5B:
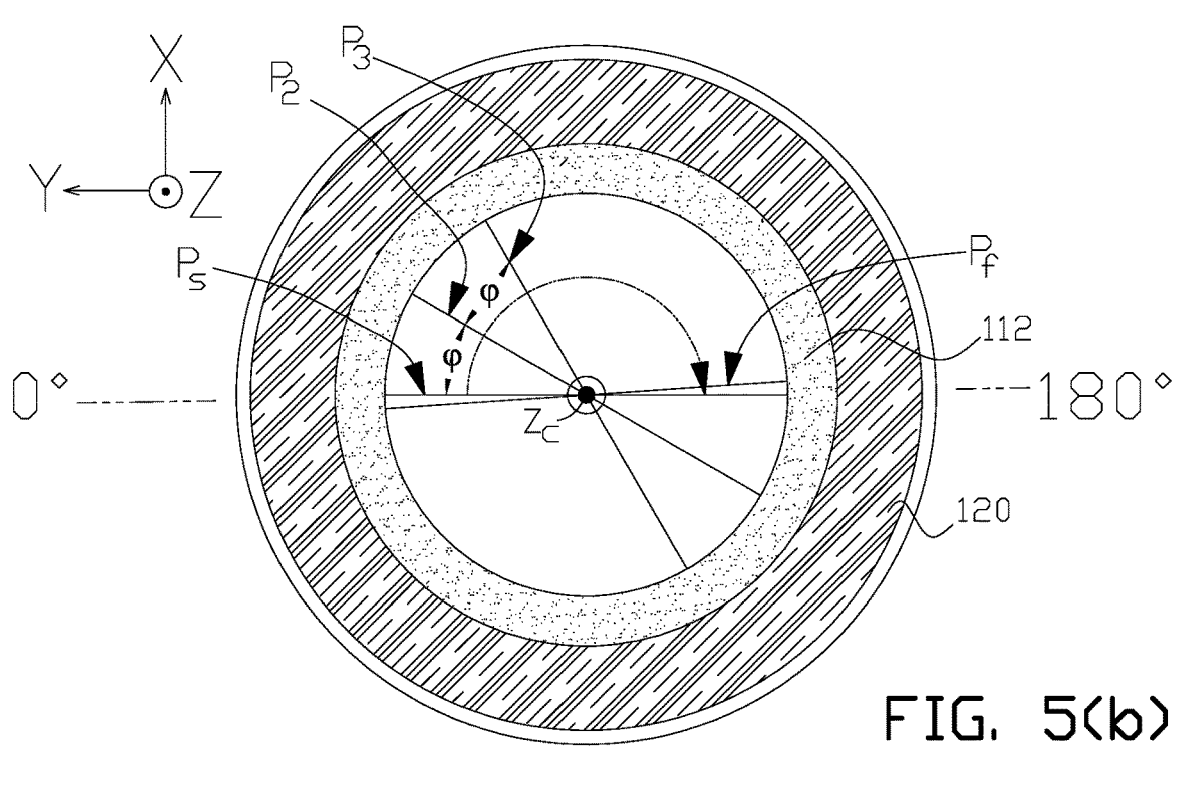
FIG. 5(b) is a top plan view of selected incremental plurality of two dimensional planar diameter scan regions as the laser imaging assembly pans 180 degrees to generate a scan series of two dimensional planar diameter scans for acquisition of refractory surface imaging data for a complete refractory surface scan data set that is ready for processing by the refractory imaging processing system.

Variable (2) is the incremental angular rotational laser shift (about a central vertically oriented $Z_c$-axis) between successive two-dimensional measurement sample diameter planes, for example, the incremental angular rotational laser shifts between successive two-dimensional measurement sample diameter planes are diagrammatically illustrated in FIG. 5(b) and the incremental angular ((p) rotational laser shift between successive two-dimensional sample diameter planes are the arc angles between adjacent laser shifts are the arc angles ($\varphi$) between adjacent two-dimensional sample diameter planes, namely $P_S$-$P_2$ and $P_2$-$P_3$ for 180 degrees in this example with diameter plane $P_s$ being at zero-180 degrees (drawing references) and $P_f$ being final diameter plane to complete a 360 degrees rotation (about the central $Z_c$ axis) of refractory surface scan since diameter plane scans are executed.

Variable (3) is the number of repetitions of laser measurement data sets obtained in either variable (1) or (2) measurement data sets or variable (1) and variable (2) measurement data sets to reduce errors in the refractory's surface image data set, for example, by repeating 10 laser measurement data sets in each measured diameter plane and using a mathematical average of the repeated 10 laser measurement data sets as the final laser measurement data set in each measure diameter plane.

In the embodiment of a refractory life cycle wear imaging and image processing system of the present invention illustrated in the drawings and described herein, laser sensor unit 32 executes the angular laser beam shift ($\theta$) between successive laser measurements in each measurement sample diameter plane and laser motion mount 34 to which the laser sensor unit is attached executes the incremental angular rotational laser shifts ($\varphi$) between successive two-dimensional measurement sample diameter planes with rotation of the laser sensor unit. At the beginning of a total refractory surface laser scan the laser beam projection of the laser sensor unit can be centered on the center $C_c$ of the (typically hot) empty crucible for the start of the first 2D plane scan, for example, by approximately centering the laser port opening 36a on the crucible's center.

Figure 9:
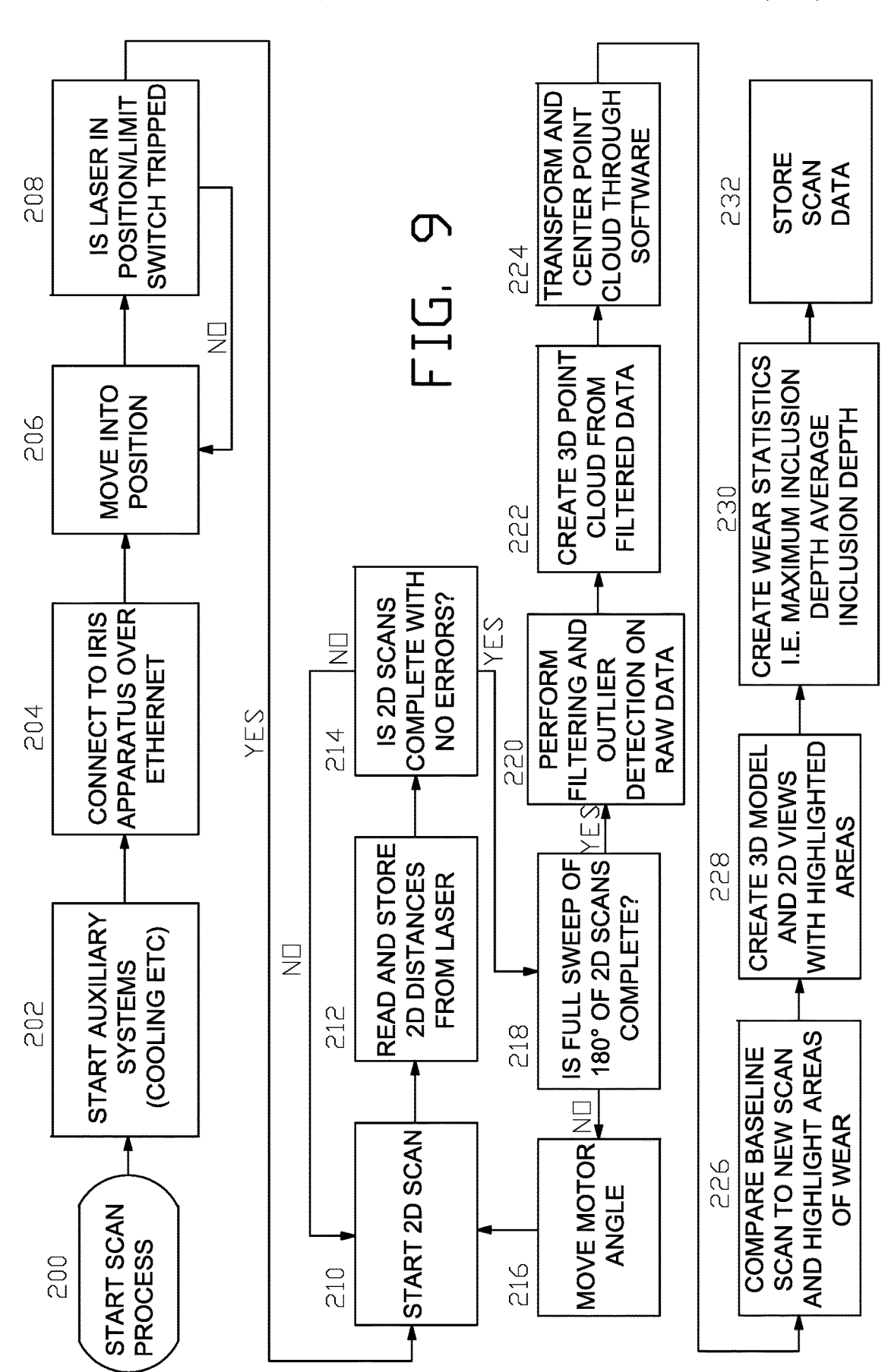
FIG. 9 is a simplified flow diagram of one example of a method of executing a furnace lining wear measurement in a refractory life cycle with a refractory life cycle wear imaging and image processing system of the present invention.

One method of refractory life cycle wear imaging and image processing of the present invention is illustrated in FIG. 9. Scan process 200 disclosed in FIG. 9 applies to each complete refractory lining surface scan (referred to as a complete refractory scan) in a series of complete refractory scans over the life cycle of consumable refractory installed in a coreless electric induction furnace for heating and melting materials. Preferably, but not limiting, the first complete refractory scan (referred to as a baseline scan) is performed after a new consumable refractory lining has been initially installed in the furnace for operation in a foundry. Subsequent complete refractory scans (each referred to as an individual production scan) are made as frequently as after each melt in the furnace has been processed and removed from the furnace, for example, by tilt pour or bottom pour of the melt, or otherwise from the coreless electric induction furnace.

In optional process step 202, if not already performed, auxiliary support systems for the refractory imaging and processing components are placed in operation. For example in the illustrated example of the invention, electric power systems are energized for the laser sensor unit and laser motion mount and supply of a cooling medium is initiated for environmental cooling within enclosure 36.

In process step 204, if not already performed, control and data communication channels, for example Ethernet cables 32a, 34a, 33a and 33b in the illustrated example of the invention are established between the infrared imaging system (IRIS) apparatus, such as laser sensor unit 32 and laser motion mount 34 in the laser imaging assembly 30 of the present invention and human machine interface (HMI) 40. In the illustrated example of the invention computer hardware (referred to collectively as the system processor) is provided in HMI 40 for writable/executable memory and storage memory for execution and storage of a refractory scan imaging and processing software (referred to as the system software) and storage of complete refractory scan data.

In process step 206 laser assembly 30 is moved to the "refractory scan" position. In some embodiments of the invention a laser assembly limit switch, or other position sensing device, is provided to sense when the laser assembly is in the "refractory scan" position when the limit switch is tripped (actuated).

In decision process step 208 laser assembly 30 is confirmed to be in the "refractory scan" position, for example, when the laser assembly limit switch transmits a tripped signal to the system software to confirm the laser sensor unit and laser motion mount are in the "refractory scan" position. If signal confirmation is not received ("NO") process step 206 is repeated and if confirmation is not received in subsequently repeated process step 208, HMI 40 transmits a system fault visual and/or audible alarm for operator action at the HMI or other system control station.

In process step 210 in the embodiment of the invention illustrated in the drawings the operator inputs a selection of "baseline scan" or "production scan" at the HMI or other control station to the system software. Preferably, but not limiting, an individual production total refractory scan is shorter in execution time (for example to maintain a required minimum production time between melt pours) that results in a lower resolution of a processed three-dimensional (3D) CAD image of the refractory surface scan. For example a typical total baseline refractory scan can be accomplished in approximately two minutes and a typical total production refractory scan can be accomplished in 30 seconds with angular ($\phi$) scan resolution between each diameter plane in FIG. 5($b$) varying from 0.1 degree for a total baseline refractory scan to 1.0 degree ($\phi$) for a total individual production laser scan of the refractory.

In process step 210, if not already entered into the system software, the operator also inputs laser scan setup variables at the HMI or other control station, including geometry parameters of the furnace, for example, approximate cross sectional parameters (such as crucible diameter and transition geometry between the furnace's interior refractory lower sidewall and the interior refractory bottom configuration).

Figure 4:
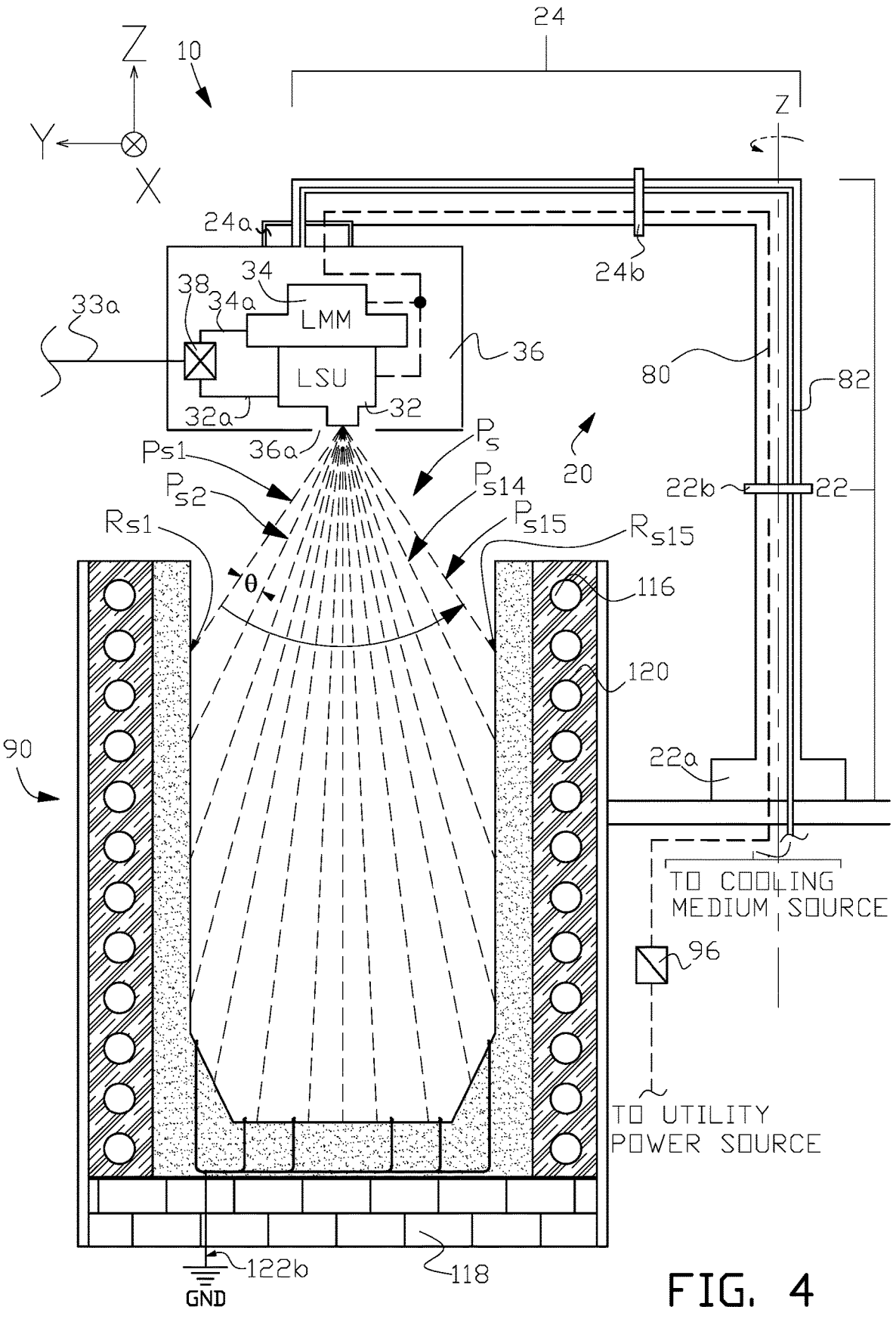
FIG. 4 illustrates the refractory life cycle wear and refractory image processing system in FIG. 3 executing one of a plurality of two dimensional planar diameter scans of the coreless electric induction furnace's replaceable refractory lining within the furnace's crucible volume.
Figure 5A:
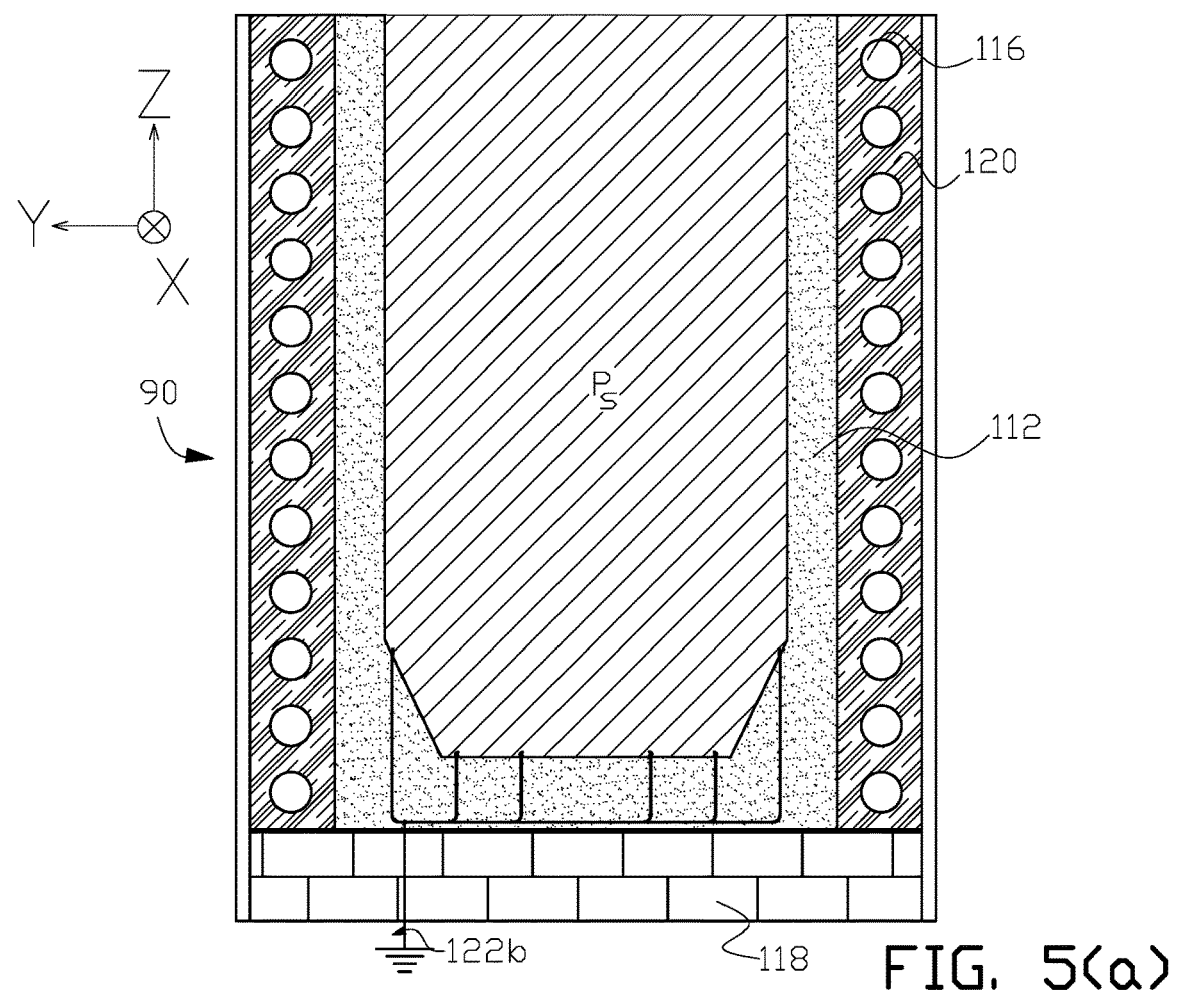
FIG. 5(a) is a cross sectional elevation view of the furnace's scan region of the two dimensional planar diameter scan in FIG. 4.

In process step 210 the system software transmits control and data signals to the laser assembly to start the initial 2D vertically oriented planar diameter refractory scan by the laser sensor unit (as shown in FIG. 4 for crucible vertical scan plane P$_s$) in the series of vertically offset angle ($\phi$) 2D vertically oriented planar diameter refractory diameter scan through 180 degrees. For example in the embodiment of the invention shown in the drawings, the initial 2D vertically oriented planar diameter refractory diameter scan is plane P$_s$ in FIG. 5($a$) and FIG. 5($b$) with incremental angular laser distance scans taken by the laser sensor unit equal to $\theta$ in FIG. 4.

In process step 212 the planar diameter scan imaging distance raw data is read by laser sensor unit 32 and stored by the system processor in storage memory.

In decision process step 214 the planar diameter scan imaging raw data read and stored in process step 212 is validated with suitable imaging data error check system software routine that executes a two dimensional planar diameter data check routine to verify the two dimensional planar diameter scan is complete without data transmission errors. If the planar diameter scan image raw data read and stored in process step 212 is not validated ("NO") process step 212 is repeated until the planar diameter scan imaging raw data read and stored in process step 212 is validated ("YES").

In decision process step 218 if the validated ("YES") planar diameter scan imaging raw data read and stored in process step 214 is not the final one in the series of vertically offset 2D vertically oriented planar diameter refractory diameter scan through 180 degrees ("NO") the HMI system processor sends a "move motor angle" control signal to the rotational motor in laser motion mount 34 in process step 216 to rotate (increment (pan) by angle $\phi$ in FIG. 5($b$)) the attached laser sensor unit to the next one in the series of 2D planar diameter refractory scans through 180 degrees.

Summarizing process steps 210 through 218, to start the laser distance scan from the laser sensor unit to the consumable refractory surface, the laser sensor unit is energized and spins in the laser sensor units' two dimensional laser scan plane; laser distance data is taken at the selected angular resolution ($\theta$) in each one of a series of two dimensional scan planes over 180 degrees; multiple laser distance data samples are taken at measurement points in a two dimensional scan plane to increase accuracy as operator selected in a particular application. Once the two dimension data is received with no communication errors, a control signal is sent to the motor in the laser motion mount to rotate (pan) one step of the required angular resolution (y) to the next one of the series of two dimensional laser scan plane. The laser refractory distance scan process repeats over 180° to generate consumable refractory surface data for a total refractory scan. Depending upon the requirements in a particular application, total consumable refractory surface raw data set is typically between 375,000 to 40,000,000 data points depending on whether the total consumable refractory surface data set is at baseline or production resolution.

If the validated ("YES") planar diameter scan imaging raw data read and stored in process step 214 is the final one of the series of vertically offset 2D vertically oriented planar diameter refractory diameter scan through 180 degrees ("YES") as determined in process step 218, in process step 220 the system processor executes a post-data collection system software routine in the system software in process step 220 to detect and processes outlier data objects in the total consumable refractory surface raw data set and generate an averaged (when multiple scans of selected data points) and smoothing filtered raw data set.

In process step 222 a 3D point cloud visualization of the scanned refractory wall is generated from the filtered raw data set generated in process step 220.

In process step 224 a transformation and center point of the 3D point cloud visualization is generated to generate a center point of the 3D point cloud visualization of the scanned refractory wall to create a centered 3D point cloud for the present refractory lining scan that establishes coherently centered and aligned refractory lining surface geometry with previous refractory lining scans.

In process step 226 the baseline refractory scan data set (or last previous refractory scan data set) is compared with the currently generated refractory scan data set to highlight areas of refractory wear (areas of observed differences in refractory surface regions).

In process step 226 the system processor executes a refractory scan comparative analysis software routine that compares the current refractory lining scan data set being processed in scan process 200 in FIG. 9 with a previous refractory lining scan data set stored in system memory. As selected by the system operator in a particular application, the comparative previous refractory lining scan may be a baseline lining scan or a selected previous production lining scan for detection of any discrepancies (related to refractory surface wear regions) between the current refractory lining scan data set and the current refractory lining scan data set and evaluation of the discrepancies.

In process step 228 a 3D CAD model is generated from the centered 3D point cloud of the present refractory lining scan along with supplementary 2D views to highlight areas of refractory wear from the discrepancies with the previous refractory lining scan. Optionally the 3D CAD model generates a graphical "fence" region on the 3D CAD model that delineates maximum wear boundaries relative to the current 3D CAD model.

In process step 230 consumable wear statistics, including maximum inclusion depth and average inclusion depth of refractory surface wear regions are created by the system computer processor and displays the consumable wear statistics on HMI 40.

Summarizing process steps 220 through 230, once the current complete refractory surface raw imaging data set is collected, outlier detection/processing and preliminary filtering/averaging of the complete raw imaging data is done. This raw data set is then used to create a three dimensional point cloud from the known angles (θ and φ) from the two axes and the distance at each angle. Filtering is done on the three dimensional point cloud to smooth the geometry. The three dimensional point cloud is analyzed and fitted to a cylindrical model; a transformation is performed on the data set to account for the laser being off center or not perfectly level during the scan. The new centered three dimensional point cloud is compared to the previous baseline refractory scan data set or a previous production refractory scan data set and areas are highlighted, for example by color coding on the percent difference in distance between the previous baseline or production scan data set and the current scan data set. The three dimensional and two dimensional views are generated with the color coding on HMI 40. Refractory wear statistics are generated from the comparative data sets including maximum inclusion depth and average inclusion depth.

In process step 232 the system processor executes a current scan data system software routine that labels and stores the current scan data to a selected system storage device.

According to the disclosure made herein one skilled in the art can program a system computer processor located, for example, within the HMI, for example the PLC or panel PC, to perform the refractory life cycle wear imaging and processing methods disclosed herein.

Figures 7A, 7B:
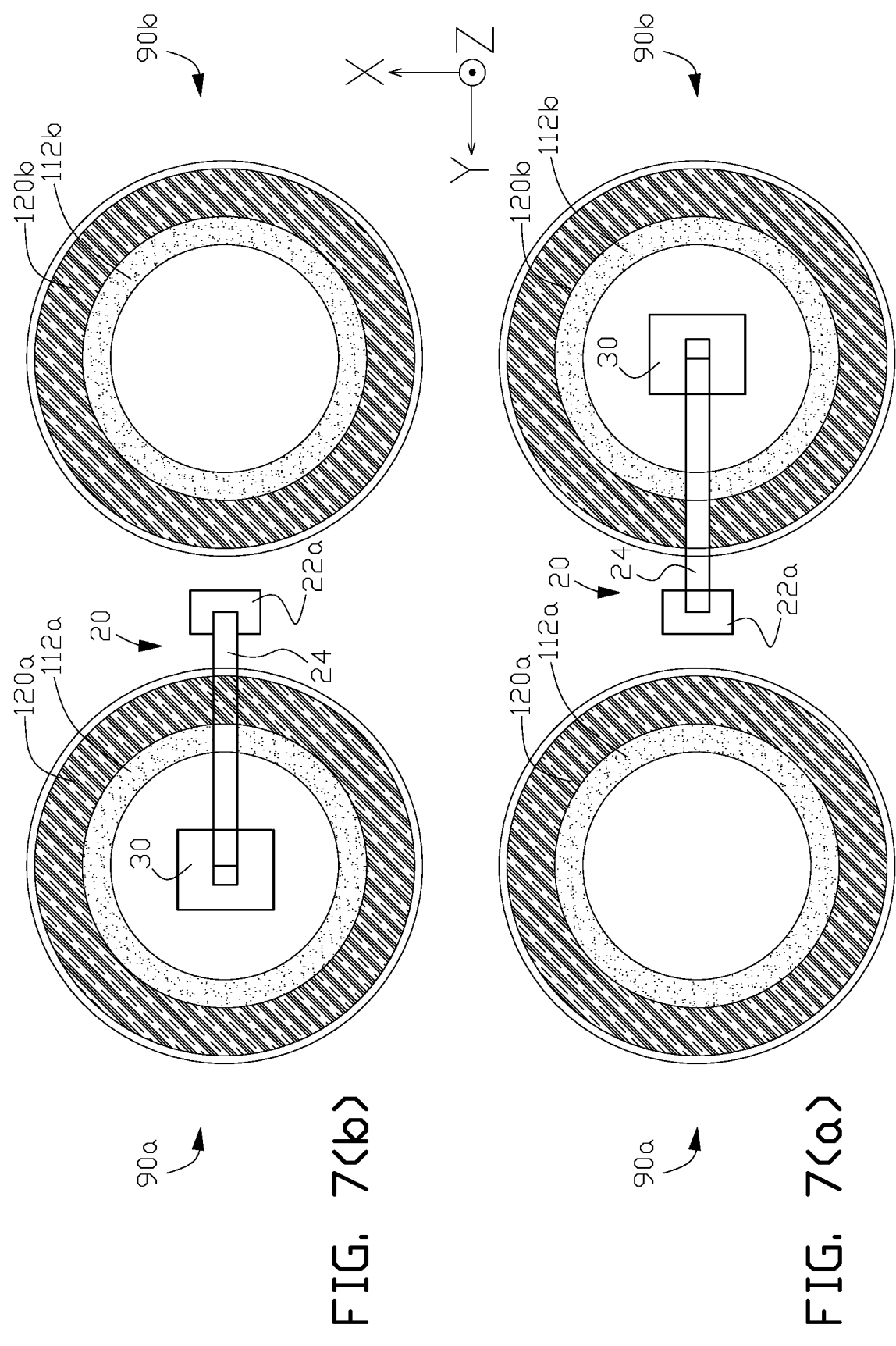
FIG. 7(a) and FIG. 7(b) illustrates a dual furnace refractory life cycle wear imaging system of the present invention where the system can be repositioned to alternatively perform scanning of the refractory lining surfaces of two electric induction furnaces in the "refractory scan" position while the system is fixedly mounted in the foundry environment.

In alternative embodiments of the invention, as shown in FIG. 7(*a*) and FIG. 7(*b*) a single foundry imagining mounting system 20 and laser imaging assembly 30 can be positioned and fixedly mounted between two induction furnaces 90*a* (with induction coil embedded in first refractory material 120*a* and first consumable refractory lining 112*a*) and 90*b* (with induction coil embedded in second refractory material 120*b* and second consumable refractory lining 112*b*) and alternatively service each of the two furnaces. Alternatively a single laser imaging assembly can be mounted on a single foundry mounting structure that is installed on a track connected to melt deck 92 and arranged relative to a plurality of electric induction furnaces in the foundry so that single laser imaging assembly 30 can travel among the plurality of electric induction furnaces and stop at each furnace in a "refractory scan" position.

Figure 8:
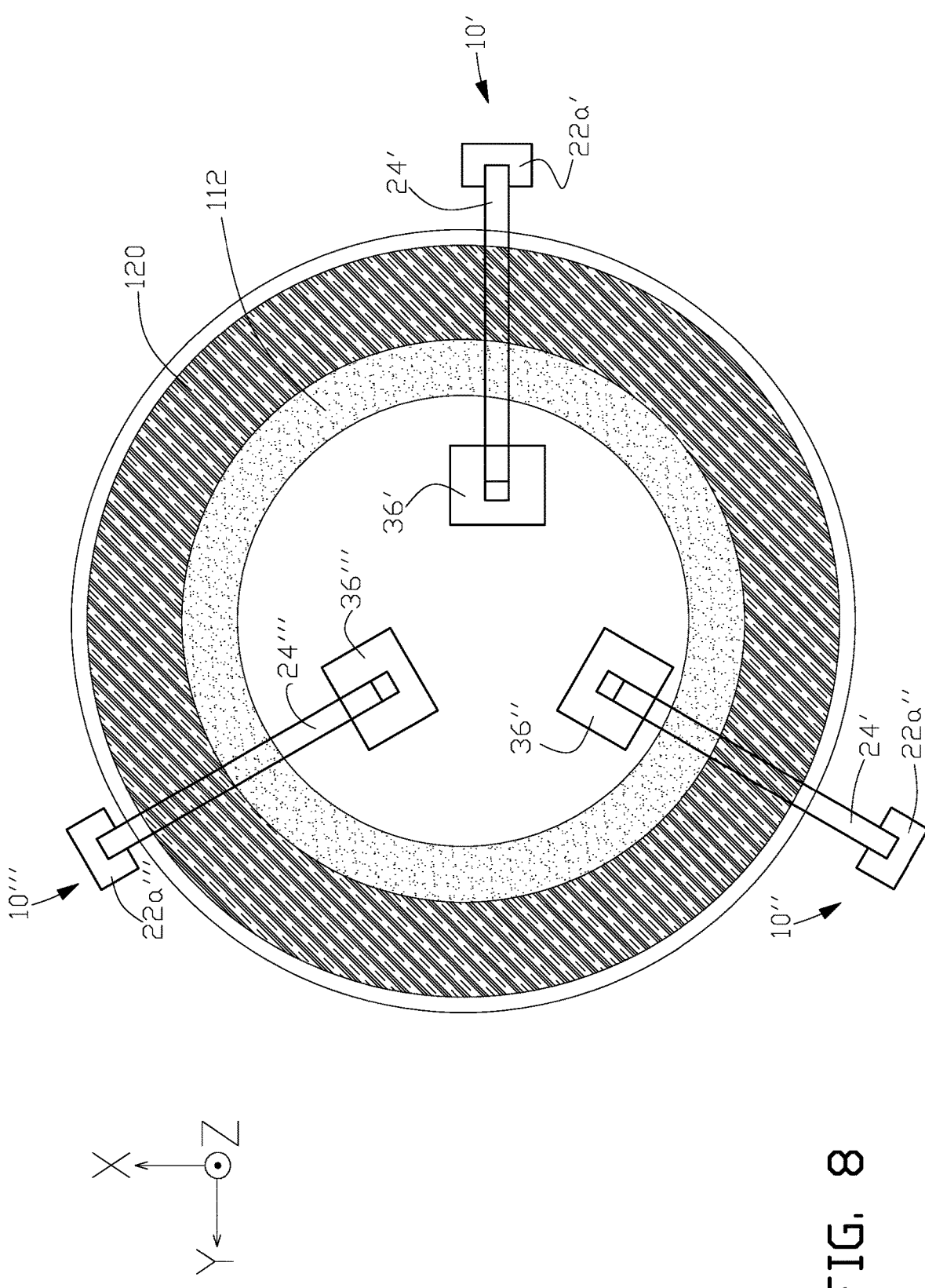
FIG. 8 is an alternative arrangement of a refractory life cycle wear imaging system of the present invention where multiple refractory life cycle wear imaging systems can simultaneously scan multiple regions of the refractory lining surface of a single electric induction furnace.

In some examples of the invention it is advantageous to use multiple foundry mounting structures 20 and laser assemblies 30 for a refractory lining's inner surface as illustrated, for example, in FIG. 8 where three separate laser assemblies 36', 36" and 36''' are used, when the geometry of the inside volume of the crucible is other than cylindrical or the geometry of the inner volume cylinder is such that laser distance measurements are problematic, for example, at the interface between the refractory side wall and bottom refractory. In these embodiments of the invention the multiple scanning planes for the multiple laser assemblies 30 may be optionally time synchronized to avoid interference between instantaneous laser beams generated by the multiple laser assemblies. The imaging digital data sets collected by each of the three laser assemblies can be stitched together with software image stitching software code in the data imaging processing software to produce a single two or three dimensional screen display or hard copy of the refractory lining surface.

The present invention also applies to electric induction furnaces where the refractory is replaced with a high temperature, electrically conductive material with a high resistivity factor such as a silicon carbide composition.

Generally the system and method of the present invention images and analyzes life cycle consumable lining wear and is not a diagnostic system and method for analysis of refractory anomalies such as refractory cracking caused by defective refractory installation or improper induction furnace operation.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A method of measuring wear of a consumable refractory lining in an empty hot crucible of an electric induction furnace for heating and melting materials, the electric induction furnace disposed in a foundry environment, the method comprising:

positioning an imaging assembly having a laser sensor unit and a motion mount attached to the laser sensor unit, the laser sensor unit and the motion mount offset above a top opening of the empty hot crucible of the electric induction furnace and approximately centered over said top opening; and performing a plurality of sequential two-dimensional diameter planar scans of a consumable refractory lining surface of the consumable refractory lining in the empty hot crucible with the laser sensor unit, each one of the plurality of sequential two-dimensional diameter planar scans performed by a beam sweep in each one of the plurality of sequential two-dimensional diameter planar scans, each one of the plurality of sequential two-dimensional diameter planar scans followed by an incremental radial rotation of the laser sensor unit around a central vertical axis of the consumable refractory lining surface by the motion mount until a sum of the incremental radial rotations after each one of the plurality of sequential two-dimensional diameter planar scans is equal to 180 degrees to generate a total consumable refractory wall scan data set for the consumable refractory lining.

2. The method of claim 1 further comprising transmitting the total consumable refractory wall scan data set to an image processing system.

3. The method of claim 1 further comprising comparing the total consumable refractory wall scan data set to a previous total consumable refractory wall scan data set in a series of periodic total consumable refractory wall scan data sets for wear of the consumable refractory lining.

4. The method of claim 3 further comprising generating a baseline total consumable refractory wall scan data set as a first one in the series of periodic total consumable refractory wall scan data sets.

5. The method of claim 1 further comprising supplying cooling medium to a protective environmental enclosure enclosing the imaging assembly at a pressure sufficient to maintain the protective environmental enclosure at a positive pressure relative to a pressure of the foundry environment.

6. A method of measuring wear of a consumable refractory lining in a crucible of an electric induction furnace for heating and melting materials, the electric induction furnace disposed in a foundry environment, the method comprising:

performing a series of periodic total consumable refractory wall surface scans, each one of the series of periodic total consumable refractory wall surface scans comprising the sequential steps:

(a) positioning a laser sensor unit attached to a motion mount offset above a crucible top opening of the electric induction furnace, the laser sensor unit approximately centered over said crucible top opening;

(b) rotating the laser sensor unit with the motion mount in a vertical two-dimensional consumable crucible refractory surface diameter scan plane;

(c) performing a plurality of planar beam scans in the vertical two-dimensional consumable crucible refractory surface diameter scan plane for a plurality of consumable refractory surface scan plane wall data points;

(d) storing the plurality of consumable refractory surface scan plane wall data points in a storage memory device;

(e) incrementing the vertical two-dimensional consumable crucible refractory surface diameter scan plane by rotation of the laser sensor unit with the motion mount through an incremental scan plane angular rotation ($\varphi$) of the laser sensor unit;

(f) if a sum of the incremental scan plane angular rotations is less than 180 degrees in step (e) perform steps (c) through (e); and (g) if the sum of the incremental scan plane angular rotations is greater than 180 degrees store the plurality of consumable refractory surface scan plane wall data points for each one of the vertical two-dimensional consumable refractory surface diameter scan planes as one of a series of periodic total consumable refractory wall scan data sets.

7. The method of claim 6 further comprising comparing at least two in the series of periodic total consumable refractory wall scan data sets for a wear of the consumable refractory lining.

8. The method of claim 7 further comprises performing a baseline new total consumable refractory wall surface scan as a first one in the series of periodic total consumable refractory wall surface scans.

9. The method of claim 6, further comprising:

repeating step (c) to generate one or more supplemental plurality of consumable refractory surface scan plane wall data points until a predetermined number of the one or more supplemental plurality of consumable refractory surface scan plane wall data points has been generated;

mathematically averaging like data points of the plurality of consumable refractory surface scan plane wall data points and the one or more supplemental plurality of consumable refractory surface scan plane wall data points to define an averaged plurality of consumable refractory surface scan data points.

10. The method of claim 6 further comprising supplying cooling medium to a protective environmental enclosure enclosing the laser sensor unit and the motion mount at a pressure sufficient to maintain the protective environmental enclosure at a positive pressure relative to a pressure of the foundry environment.

11. The method of claim 8 further comprising transferring the one of the series of periodic total consumable refractory wall scan data sets from the laser sensor unit by an Ethernet network to a system processor.

12. The method of claim 11 wherein the system processor comprises a human machine interface comprising the system processor, the storage memory device and an executable memory device for execution of a system software.

13. The method of claim 12 further comprising:

executing in the system software a post-data collection system software routine for a detection and processing of one or more outlier data objects in the one of the series of periodic total consumable refractory wall scan data sets and a smoothing filter of the one of the series of periodic total consumable refractory wall scan data sets to generate one in a series of periodic filtered total consumable refractory wall scan data sets;

generating a 3D point cloud visualization of the consumable refractory lining from the one in the series of periodic filtered total consumable refractory wall scan data sets on a display device in the human machine interface;

generating a center point of the 3D point cloud visualization in the post-collection system software routine, the center point coherently centered and aligned with a consumable refractory lining surface geometry of a previous 3D point cloud visualization for each one of the series of periodic filtered total consumable refractory wall scan data sets previously generated;

comparing one or more of the series of periodic filtered total consumable refractory wall scan data sets previously generated with the post-collection system software routine to measure wear of the consumable refractory lining.

14. The method of claim 13 further comprising displaying on the display device one or more consumable refractory wear statics selected from the group of a maximum inclusion depth and an average inclusion depth of one or more consumable refractory surface wear regions.

15. A method of measuring wear of a consumable refractory lining surface in an empty hot crucible of an electric induction furnace for heating and melting materials, the electric induction furnace disposed in a foundry environment, the method comprising:

positioning an imaging assembly having a laser sensor unit and a motion mount attached to the laser sensor unit, the laser sensor unit and the motion mount offset above a top opening of the empty hot crucible with the laser sensor unit and the motion mount approximately centered over the empty hot crucible;

executing a plurality of sequential two-dimensional planar scans of the consumable refractory lining surface with the laser sensor unit in the empty hot crucible, each of the plurality of sequential two-dimensional planar scans performed by a beam sweep in each of the plurality of sequential two-dimensional planar scans, each of the plurality of sequential two-dimensional planar scans followed by a plurality of radial rotations of the laser sensor unit by the motion mount to generate a refractory lining surface scan raw data set; and transmitting the refractory lining surface scan raw data set from the laser imaging assembly to a human machine interface for an image processing of the refractory lining surface scan raw data set.

16. The method of claim 15 further comprising supplying cooling medium to a protective environmental enclosure enclosing the imaging assembly at a pressure sufficient to maintain the protective environmental enclosure at a positive pressure relative to a pressure of the foundry environment.

* * * * *